(12) United States Patent
Pluta (10) Patent No.: US 9,215,917 B2
(45) Date of Patent: Dec. 22, 2015

(54) COMPACT PROTECTIVE COVER FOR EYEWEAR

(71) Applicant: Michael Richard Pluta, Huntington Beach, CA (US)

(72) Inventor: Michael Richard Pluta, Huntington Beach, CA (US)

(*) Notice: Subject to any disclaimer, the term of this patent is extended or adjusted under 35 U.S.C. 154(b) by 0 days.

(21) Appl. No.: 13/840,710

(22) Filed: Mar. 15, 2013

(65) Prior Publication Data

US 2014/0262843 A1 Sep. 18, 2014

(51) Int. Cl.
*A45C 11/04* (2006.01)
*G02C 9/04* (2006.01)

(52) U.S. Cl.
CPC .......... *A45C 11/04* (2013.01); *A45F 2200/0541* (2013.01); *G02C 9/04* (2013.01)

(58) Field of Classification Search
CPC ... A45C 11/04; A45F 2200/0541; G02C 9/04
USPC .................. 206/5, 6; 220/4.22–4.24; 134/901
See application file for complete search history.

(56) References Cited

U.S. PATENT DOCUMENTS

| 474,235 | A | * | 5/1892 | Farley | 206/5 |
| 2,747,729 | A | * | 5/1956 | Stegeman | 206/6 |
| 2,762,500 | A | * | 9/1956 | Parsell | 206/5 |
| 5,949,517 | A | | 9/1999 | Lindberg et al. | |
| 6,415,915 | B1 | * | 7/2002 | Grossman | 206/6 |

FOREIGN PATENT DOCUMENTS

| CN | 102135669 A | 7/2011 |
| CN | 202269543 U | 6/2012 |
| JP | 07014425 U | 3/1995 |
| JP | 4011034 B2 | 11/2007 |
| WO | 2011095864 A2 | 8/2011 |

* cited by examiner

*Primary Examiner* — Anthony Stashick
*Assistant Examiner* — Mollie Llewellyn
(74) *Attorney, Agent, or Firm* — Plager Schack LLP (57) ABSTRACT

Protective eyewear cover that may be folded into or onto itself when removed from the eyewear, resulting in a profile that is slightly thicker than and slightly larger than the size of a single lens of the eyewear. The protective eyewear cover of the present invention is compact in comparison to certain conventional eyewear protection, such as a hard or semi-hard eyeglass case, yet offers maximum protection in comparison to other conventional eyewear protection, such as eyeglass bags or pouches.

3 Claims, 10 Drawing Sheets

COMPACT PROTECTIVE COVER FOR EYEWEAR

FIELD OF THE INVENTION

The present invention relates to eyewear. More particularly, the present invention relates to protective covering for eyewear.

BACKGROUND

Presently, when a consumer purchases eyewear, such as prescription glasses, sunglasses or any other type of eyeglasses, the consumer basically has but two options with respect to protecting the eyewear from scratches and other types of damage. The first option is the hard case (or semi-hard case). This first option gives the consumer the greatest level of protection because the case completely encloses the eyewear. Hard cases are typically clam shell type cases or zippered type cases. Both of these hard cases work very well when it comes to protecting the eyewear. However, many consumers dislike hard cases because they are bulky, they take up a fair amount of space and they do not comfortably or easily fit in pockets. The second option is the bag (or pouch). The bag does have certain advantages. For instance, the fabric may be used to clean the eyewear lenses and it is very light in weight, not particularly bulky and, therefore, easy carry. Despite these advantages, this second option offers minimal protection because the eyewear lenses are still susceptible to being broken, scratched or otherwise damaged if dropped, placed next to a sharp or hard object, or stepped upon, as the bag is made from very fine fabric.

For the above-stated reasons, consumers that do not carry or otherwise use a purse or carry-bag tend to avoid using hard cases altogether, so the hard case remains in the car, in the office or at home. The bag, while easy to carry, is also easy to misplace, as it is just fabric. Consequently, many consumers simply use no protection for their eyewear. The problem, of course, is without protection, there is a much greater risk of doing damage to the eyewear, and eyewear can be very expensive to repair or replace. Consumers that regularly wear eyeglasses know that even a small scratch on a lens can be very annoying and uncomfortable to see through.

Accordingly, there exists a need for eyewear protection that provides good protection without suffering the disadvantages associated with the hard case and bag type eyewear protection described above. As explained herein below, the compact eyewear protective cover of the present invention satisfies this need.

SUMMARY OF THE INVENTION

The present invention provides maximum protection for eyewear without the aforementioned and other deficiencies associated with conventional eyewear protection. Moreover, the present invention is fun to use.

In general, the protective eyewear cover, in accordance with exemplary embodiments of the present invention, takes advantage of the symmetry and/or contour (i.e., curvature) associated with most eyeglasses. When removed from the eyeglasses, the protective cover may be folded into itself, resulting in a profile that is only slightly thicker than and only slightly larger than the size of a single lens of the eyeglasses it is intended to protect. Thus, the protective cover of the present invention is compact in comparison to conventional eyewear protection; as such, consumers should find the protective cover of the present invention easier and more convenient to carry, while still getting maximum protection for the eyeglasses.

In accordance with one aspect of the present invention, the aforementioned purposes are achieved by a compact protective cover for eyewear. The cover comprises a first sleeve configured to receive at least a first lens associated with the eyewear and a second sleeve configured to receive at least a second lens associated with the eyewear. The protective cover also comprises an attachment mechanism connecting the first sleeve and the second sleeve such that the first sleeve and the second sleeve are capable of being moved, relative to each other, between a deployed configuration and a collapsed configuration. In the deployed configuration, the first sleeve and the second sleeve are positioned side-by-side and in the collapsed configuration, the first sleeve and the second sleeve are overlapping or substantially overlapping.

In accordance with another aspect of the present invention, the aforementioned purposes are achieved by a compact protective cover for eyewear. The cover comprises a first sleeve that, in turn, comprises a front pad and a rear pad, the first sleeve being configured to receive at least a first lens associated with the eyewear between its front pad and rear pad. the cover also comprises a second sleeve that, in turn, comprises a front pad and a rear pad, the second sleeve being configured to receive at least a second lens associated with the eyewear between its front pad and rear pad. Still further, the cover comprises an attachment mechanism connecting the first sleeve and the second sleeve such that the first sleeve and the second sleeve are capable of being moved, relative to each other, between a deployed configuration and a closed configuration. In the deployed configuration, the first sleeve and the second sleeve are positioned side-by-side. In the collapsed configuration, the first sleeve and the second sleeve are overlapping or substantially overlapping.

BRIEF DESCRIPTION OF THE DRAWINGS

Several figures are provided herein to further the explanation of the present invention. More specifically.

DETAILED DESCRIPTION OF THE INVENTION

It is to be understood that both the foregoing general description and the following detailed description are exemplary. The descriptions herein are not intended to limit the scope of the present invention. The scope of the present invention is governed by the scope of the appended claims.

Figure 1A:
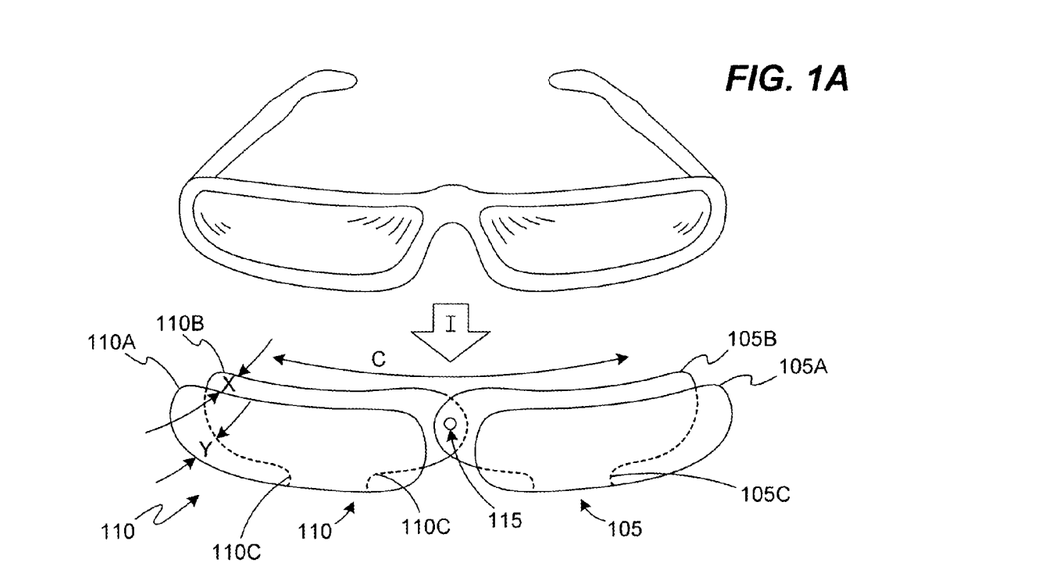
FIGS. 1A-1C illustrate a protective cover in accordance with a first exemplary embodiment of the present invention.

FIG. 1A is an illustration of a protective cover 100 in accordance with a first exemplary embodiment of the present invention. FIG. 1A also illustrates a pair of eyeglasses to assist in the description and understanding of the protective cover 100. As shown, the protective cover 100 comprises a first sleeve 105 and a second sleeve 110. Both the first sleeve 105 and the second sleeve 110 comprise a front and a rear pad. Thus, the first sleeve 105 has a front pad 105A and a rear pad 105B. Likewise, the second sleeve 110 has a front pad 110A and a rear pad 110B. The front and rear pads 105A and 105B of the first sleeve 105 are attached to each other by a pad connecting portion 105C, while the front and rear pads 110A and 110B of the second sleeve 110 are attached to each other by a pad connecting portion 110C.

In the first exemplary embodiment, the first sleeve 105 and a second sleeve 110 are rotatably attached to each other. As shown in FIG. 1A, the first sleeve 105 and the second sleeve 110 are rotatably attached at a point where the rear pad 105B and the rear pad 110B overlap each other. In this first exemplary embodiment, the attachment mechanism 115 may be a pin, a post, a rivet or any other like component in conjunction with a receiving component, such as a receiving hole(s), so long as the attachment mechanism 115 allows the first sleeve 105 and the second sleeve 110 to snap together or otherwise interlock and rotate relative to each other, as illustrated by vector R in FIG. 1B. As will be evident from other exemplary embodiments described below, the attachment mechanism may allow the first sleeve 105 and the second sleeve 110 to collapse into each other in ways other than rotation.

FIG. 1A further illustrates that the first sleeve 105 and the second sleeve 110 have a contour C to accommodate the curvature of the eyeglasses, or more specifically, the curvature of the lenses and, depending upon the eyeglasses, the curvature of the frame around the lenses. It will be understood that the protective cover 100 could be manufactured so that the contour C is customized to accommodate a specific pair eyeglasses, such as designer eyeglasses, or it could be manufactured so that the contour C is somewhat generic, to match the average curvature of most ordinary eyeglasses.

In accordance with a preferred embodiment, the spacing between the upper edges of the front and rear pads and the spacing between the lower edges of the front and rear pads will differ in order to anchor the protective cover 100 to the eyeglasses. Thus, for example, the spacing X between the front and rear pads in FIG. 1A, and illustrated in FIG. 2B, may be less than the spacing Y between the front and rear pads. Consequently, when the eyeglasses are inserted between the front and rear pads, as illustrated by arrow I in FIG. 1A, such that the bottom of the frame associated with the eyeglasses rests on the pad connection portions 105C and 110C, the spacing X is such that the corresponding edges of the front and rear pads contact the eyeglasses under a slight clamping pressure sufficient to anchor the protective cover 100 in place. However, the spacing X is not so narrow that inserting the eyeglasses between the front and rear pads, and removing the eyeglasses from between the front and rear pads requires any significant force or effort. The spacing Y is such that there is minimal contact between the protective cover 100 and the eyeglasses in order to avoid wear. Additionally, the size or area of the front and rear pads are such that the lenses are completely covered, or at least substantially covered by the front and rear pads.

Figure 2A:
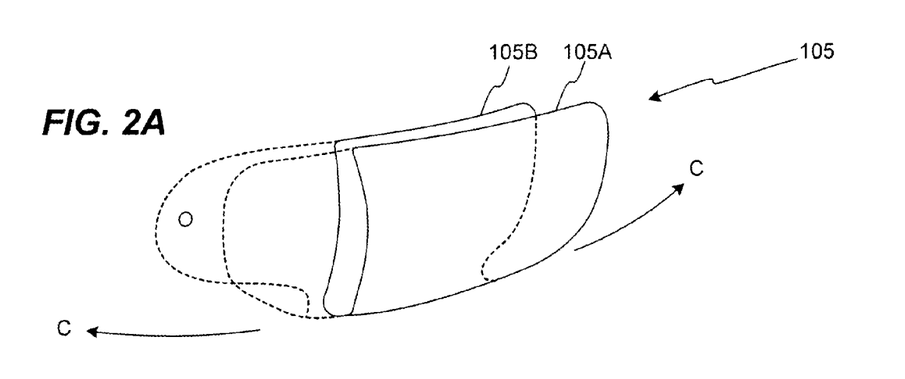
FIGS. 2A-2B illustrate the contour and spacing associated with the sleeves of the protective cover in accordance with the first exemplary embodiment of the present invention.
Figure 2B:
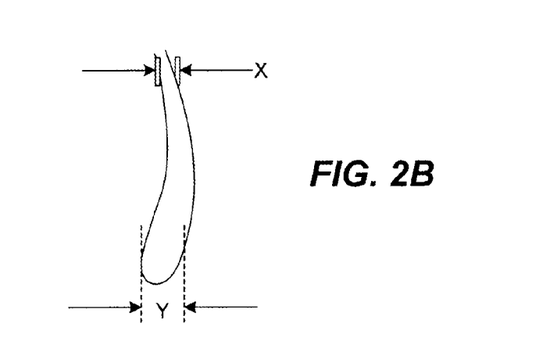

FIG. 2A is a cut-away view of the first sleeve 105 in FIG. 1A. FIG. 2A more clearly illustrates the contour C described above. FIG. 2B is a cross-section view of the first sleeve 105 illustrated in FIG. 2A, and it more clearly illustrates the difference in the spacing X and Y, also described above, which produces the slight clamping force or pressure that anchors the protective cover 100 to the eyeglasses with minimal contact. As will become evident from the description that follows, all but one of the exemplary embodiments exhibit some contour or degree of curvature, but for the very last embodiment. The purpose of describing the last embodiment as exhibiting little or no contour is to clarify that the scope of the invention is not limited by the contour, that is, the amount of curvature exhibited by the protective cover, even though a protective cover in accordance with a preferred embodiment will exhibit at least some contour. As such, a protective cover according to the present invention may have no contour, a small amount of contour or a significant amount of contour, depending on the eyeglasses the protective cover is intended to protect.

Figure 1B:
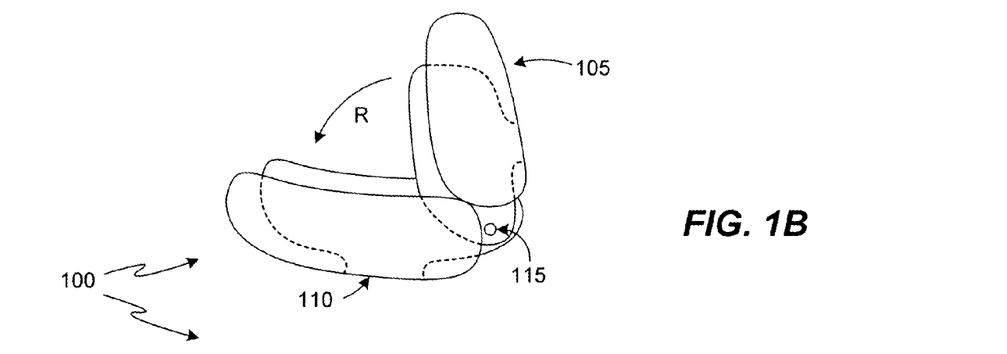
Figure 1C:
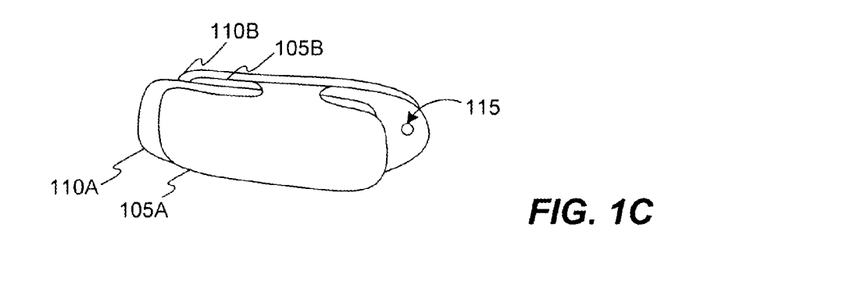

FIGS. 1A-1C also illustrate the operation of the protective cover 100. Thus, for example, FIG. 1A illustrates the protective cover 100 in a deployed configuration where the protective cover 100 is open and the first and second sleeves 105 and 110 are generally positioned side-to-side relative to each other. FIG. 1C illustrates a collapsed configuration where the protective cover 100 is closed and the first and second sleeves 105 and 110 are interleaved and, therefore, overlapping, or substantially overlapping. And, FIG. 1B illustrates a configuration where the protective cover 100 is somewhere between the deployed and closed configurations.

It should be evident from the figures that the protective cover 100 moves between the deployed configuration and the collapsed configuration by rotating the first sleeve 105 and the second sleeve 110 relative to each other. This is also made possible by the fact that the first sleeve 105 and the second sleeve 110 are generally symmetric and slightly offset relative to each other in a front to back direction. Therefore, when the first sleeve 105 and the second sleeve 110 are completely folded in on themselves, the front and rear pads of the first sleeve 105 and the second sleeve 110 are interleaved, as mentioned above. When the protective cover 100 is in this collapsed configuration, it is clear, from FIGS. 1A, 1B and 1C, that the profile of the protective cover 100 is, as stated above, only slightly larger than one of the lens associated with the eyeglasses depicted in FIG. 1A.

The protective cover 100 may be manufactured in accordance with known techniques and materials. For example, the protective cover 100 may be manufactured by injection molding, layered printing, stamped or any other suitable process. Additionally, the protective cover 100 may be made of any hard and/or durable material, lined with a soft or padded fabric on the inside to protect the lenses. Whether the protective cover 100 is made of plastic or metal, the first and second sleeves 105 and 110 are to be sufficiently pliable so they can be spread open to allow the lenses and, if applicable, the frame to pass through. Moreover, it will be understood that each of the sleeves 105 and 110 may be manufactured as a single, monolithic unit or as multiple components (e.g., as a front pad, a rear pad and a pad connection portion) that are subsequently attached to each other by a suitable method. It will also be understood that the attachment mechanism 115 may be a component(s) that is/are manufactured separate and apart from the sleeves, or manufactured as an integral part of a sleeve. For example, if the attachment mechanism 115 is in the form of a post and receiving hole, as mentioned above, the post and hole may be integral parts of and, thus, manufactured as part of the corresponding sleeves.

Figure 3:
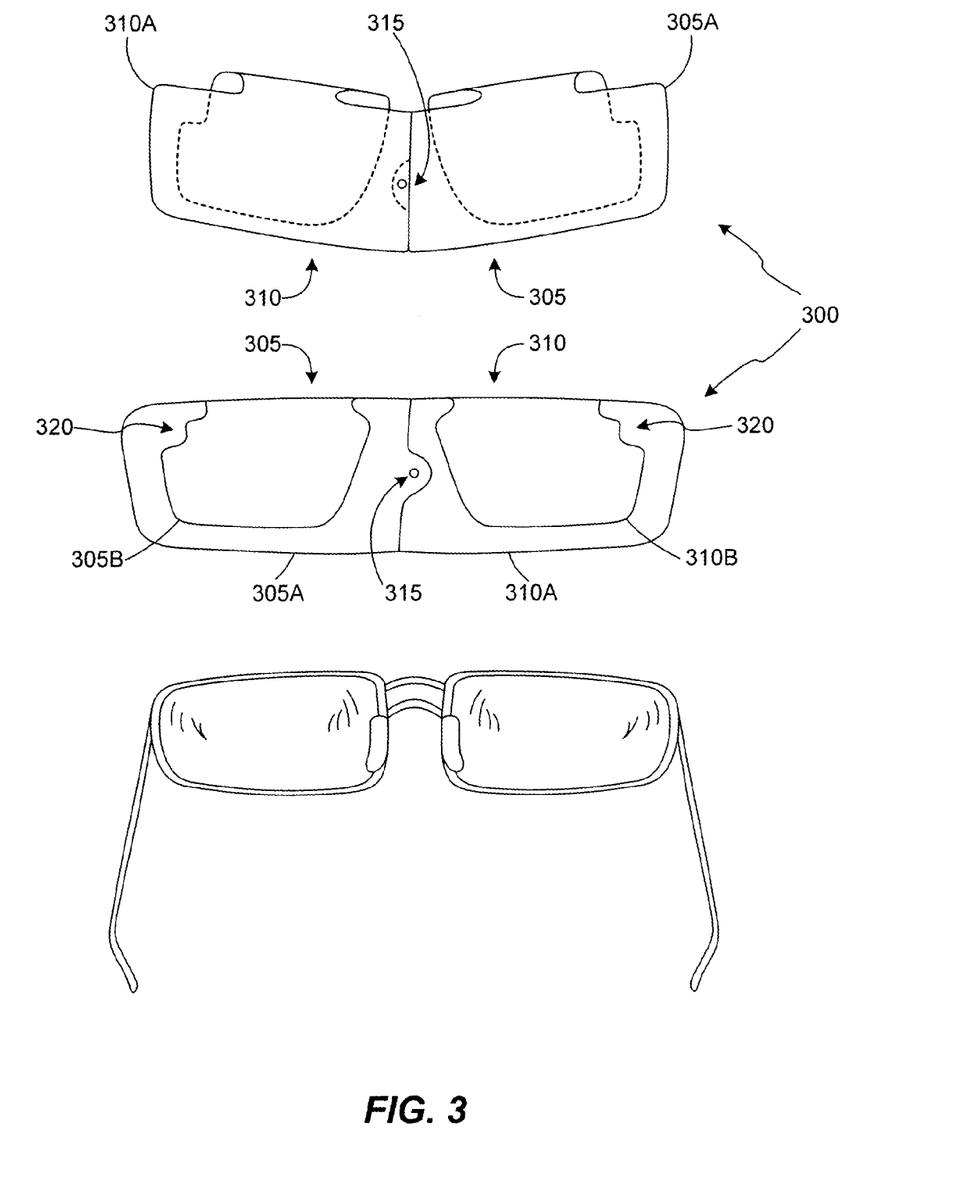
FIG. 3 illustrates an front and rear view of a protective cover, in accordance with an alternative to the first exemplary embodiment of the present invention.

Although the protective cover 100 comprises an attachment mechanism 115 that attaches the rear pad 105B and the rear pad 110B where the two overlap, it will be appreciated by those skilled in the art of eyewear that the attachment mechanism could, in contrast, attach the two front pads in a similar fashion. Thus, FIG. 3 illustrates a front and rear view of protective cover 300, in accordance with an alternative to the first exemplary embodiment, wherein protective cover 300 comprises a first sleeve 305 and a second sleeve 310, and wherein the front pad 305A of the first sleeve 305 is attached to the front pad 310A of the second sleeve 310 by an attachment mechanism 315, in the same or similar manner described above and illustrated in FIG. 1A. One reason for this alternative embodiment is to better accommodate the bridge and/or nose pads of the eyeglasses. For example, if the eyeglasses have nose pads, and the nose pads protrude forward, or primarily forward, it may be advantageous to attach the rear pad of the first sleeve to the rear pad of the second sleeve, thus allowing the nose pads to protrude into or through the space between the front pads, as illustrated in FIG. 1A. However, if the nose pads protrude rearward, or primarily rearward, it may be advantageous to attach the front pad of the first sleeve to the front pad of the second sleeve thus allowing the nose pads to protrude into or through a similar space that would exist between the rear pads, as illustrated in FIG. 3.

FIG. 3 also illustrates that the present invention is not limited to a protective covering that slides in an upward direction relative to and over the lenses of the eyewear, as depicted in FIG. 1A. In FIG. 3, the protective cover 300 actually slides in a downward direction relative to and over the lenses of the eyewear.

Additionally, in FIG. 3, the rear pads 305B and 310B are shown as comprising a cut-out or notched corner 320. The purpose for these would be to allow for more space to accommodate the bridge of the eyeglasses. While these cut-out or notched features are only illustrated in FIG. 3, it will be appreciated that such features may be applied to any one of the embodiments described herein.

FIGS. 4A-4D illustrate a protective cover 400, in accordance with a second exemplary embodiment. In this second exemplary embodiment, a first sleeve 405 is rotationally attached to a second sleeve 410, similar to the first exemplary embodiment described above, but for the attachment mechanism 415 is a spring mechanism. As shown, the spring mechanism 415 is anchored to the first sleeve 405 at point B and to the second sleeve 410 at point A. It will be understood from the discussion above that point A and B could be on either the front pads or the rear pads of the first and second sleeves 405 and 410. Additionally, the spring mechanism 415 is wound around a pivot point P, common to both the first and second sleeves 405 and 410, that may involve a pin, a post or some other like component.

Figure 4A:
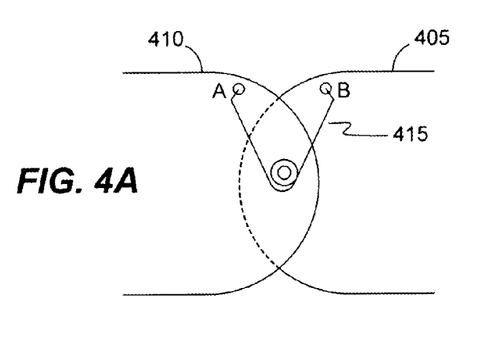
FIGS. 4A-4D illustrate a protective cover, in accordance with a second exemplary embodiment of the present invention.
Figure 4B:
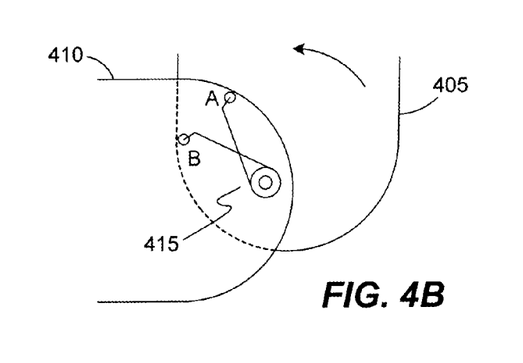
Figure 4C:
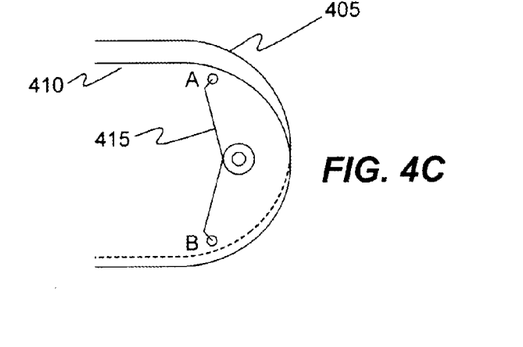
Figure 4D:
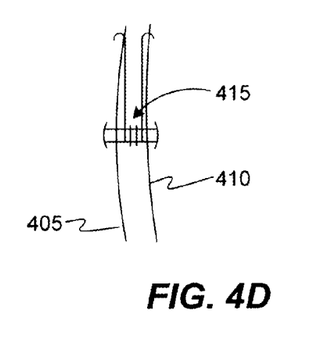

FIGS. 4A-4C also illustrate the operation of the protective cover 400. More specifically, FIG. 4A illustrates a deployed configuration where the protective cover 400 is open, the first and second sleeves 405 and 410 are generally positioned side-to-side relative to each other, and the spring mechanism 415 is under minimal tension. FIG. 4C illustrates a collapsed configuration where the protective cover 400 is closed, the first and second sleeves 405 and 410 are overlapping, or substantially overlapping, and the spring mechanism 415 is under maximum tension. And, FIG. 4B illustrates a configuration where the protective cover 400 is somewhere between the deployed and closed configurations. Although it is not shown, the present invention may include a lock and release mechanism in conjunction with the spring mechanism 415, where the lock and release mechanism would hold the spring mechanism 415 in the position illustrated in FIG. 4C and, when activated, release the spring mechanism 415 from the position illustrated in FIG. 4C, so as to automatically deploy the protective cover 400. FIG. 4D illustrates a side view corresponding to the position of the protective cover 400 in FIG. 4A.

Figures 5A, 5B:
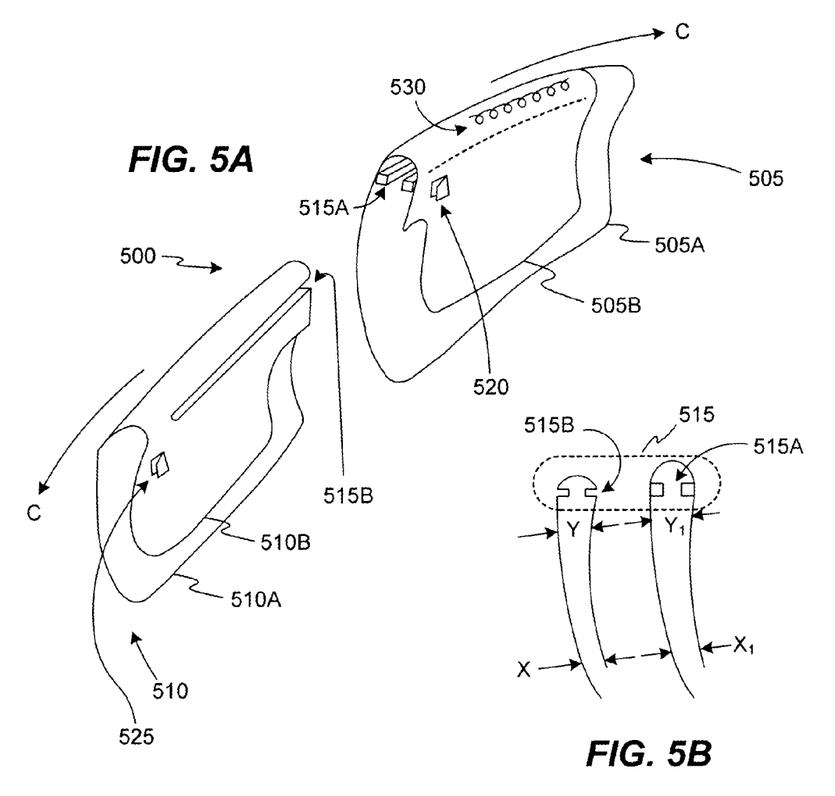
FIGS. 5A-5E illustrate a protective cover, in accordance with a third exemplary embodiment of the present invention.
Figure 5C:
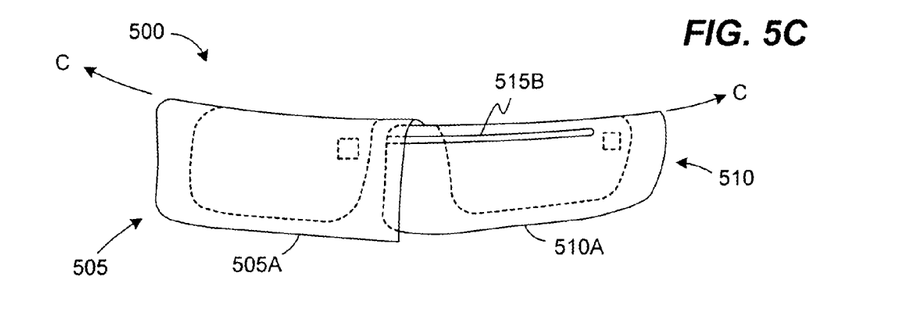
Figure 5D:
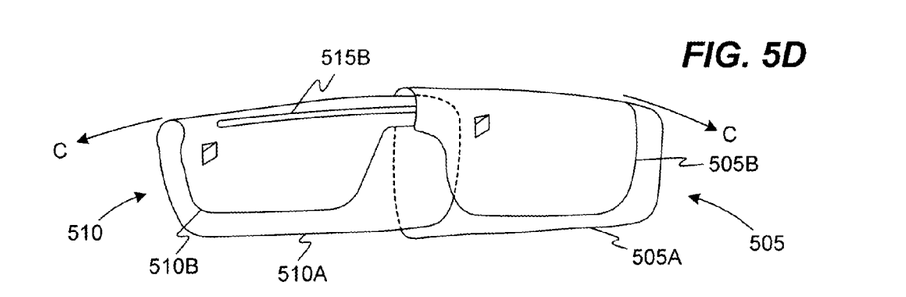
Figure 5E:
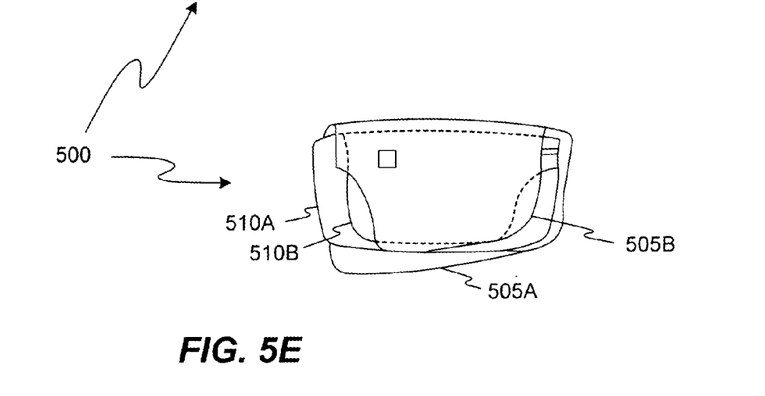

FIGS. 5A-5E illustrate a protective cover 500, in accordance with a third exemplary embodiment of the present invention. Generally, FIGS. 5A and 5B illustrate an exploded view of the protective cover 500, whereas FIGS. 5C and 5D illustrate a front and rear view of the protective cover 500, respectively, of the protective cover 500 in a deployed configuration, and FIG. 5E illustrates a rear view of the protective cover 500 in a collapsed configuration.

As shown, protective cover 500 comprises a first sleeve 505 and a second sleeve 510. Also, as shown, the first sleeve 505 comprises a front pad 505A and a rear pad 505B. Likewise, the second sleeve 510 comprises a front pad 510A and a rear pad 510B. Unlike the first and second exemplary embodiments described above, the first sleeve 505 and the second sleeve 510 are not rotatably attached. Instead, attachment mechanism 515 slidably attaches the first sleeve 505 and the second sleeve 510. In this example, the attachment mechanism 515 comprises a rail 515A and a track 515B, where the track 515B is configured to receive the rail 515A, such that the rail 515A can slide along track 515B between a deployed configuration, where the protective cover 500 is open and the first and second sleeves 505 and 510 are generally positioned side-by-side relative to each other, and a collapsed configuration, wherein the protective cover 500 is closed and the first and second sleeves 505 and 510 are in an overlapping or substantially overlapping position relative to each other.

To prevent the first sleeve 505 and the second sleeve 510 from becoming detached, the track 515B may include a stopping mechanism(s) (not shown). The stopping mechanism(s) would prevent the movement of the rail 515A from deploying beyond a point that might cause the first sleeve 505 and the second sleeve 510 to detach (similar to the stopping mechanisms used to prevent drawers from sliding out of a cabinet).

Further, each of the first and second sleeves 505 and 510 comprises a locking mechanism 520 and 525, respectively. When the protective cover 500 is in the collapsed configuration, as illustrated in FIG. 5C, the protective cover 500 may be held in this configuration by the insertion of locking mechanism 525 through locking mechanism 520. When the consumer wishes to deploy the protective cover 500, the consumer would push on the locking mechanism 520, thereby unlocking the first and second sleeves.

As shown in FIG. 5A, the protective cover 500 may also comprise a spring 530. The spring may be located on the inner portion of the first sleeve 505, above the track 515A. When the protective cover 500 is in the collapsed configuration, the spring 530 would be compressed. When the protective cover 500 is in the deployed configuration, the spring 530 would be at rest. It will be understood, the spring 530 may be employed alone or in conjunction with the aforementioned locking mechanisms 520 and 525 to apply a separating force on the first and second sleeves 505 and 510, so as to automatically deploy the protective cover 500, when the consumer unlocks the sleeves. It will be understood that the specific design of the locking mechanism(s) and/or spring may vary without departing from the scope or spirit of the present invention.

It will also be understood that while this third exemplary embodiment may be spring-loaded, as described above, other forms of deploying and collapsing the protective cover 500 are possible. For example, protective cover 500 may be deployed and collapsed by a purely manual process, where the consumer simply grasps both the first and second sleeves 505 and 510 and gently moves them together or apart. Another possibility is that the protective cover 500 may comprise a slide button or tab, similar to a drywall knife, where the consumer moves the tab in one direction or the other, thereby moving the first and second sleeves 505 and 510 together or apart relative to each other.

To minimize the overall thickness of the protective cover 500, the thickness of the first sleeve 505, which comprises rail 515A, is greater than the thickness of the second sleeve 510, which comprises track 515B. As such, the second sleeve 510 will be contained between the front and rear pads 505A and 505B of the first sleeve 505 (interleaved) when the protective cover 500 is in the collapsed configuration.

Despite the fact that the protective cover 500 employs a different attachment mechanism than protective covers 100 and 400 described above, protective cover 500 does share certain common features with the protective covers 100 and 400. For example, the protective cover 500 has a contour C, as illustrated in FIGS. 5A, 5C and 5D, that matches or substantially matches the contour of the eyeglasses it is intended to protect. Also, the spaces X and $X_1$, illustrated in FIG. 5B, between the lower portions of the first and second sleeves 505 and 510 are narrower than the spaces Y and $Y_1$, between the upper portions of the first and second sleeves 505 and 510, respectively. Again, the purpose of this is to create a slight clamping pressure on the eyeglasses so that the protective cover 500 is anchored to the eyeglasses, but only so much so that the eyeglasses can be easily inserted into and easily removed from the protective cover 500.

Figure 6A:
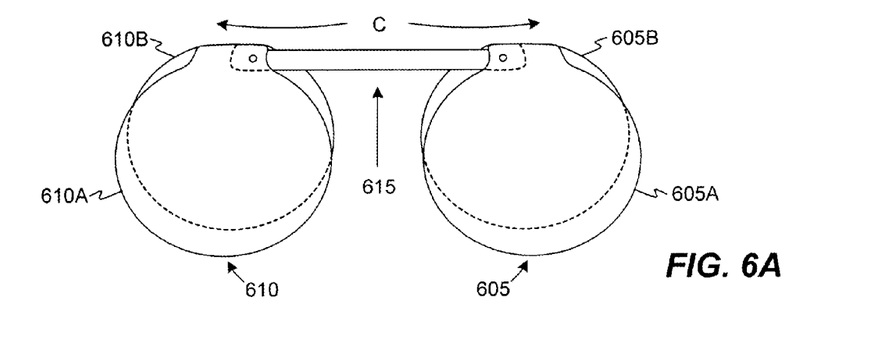
FIGS. 6A-6B illustrate a protective cover, in accordance with a fourth exemplary embodiment of the present invention.
Figure 6B:
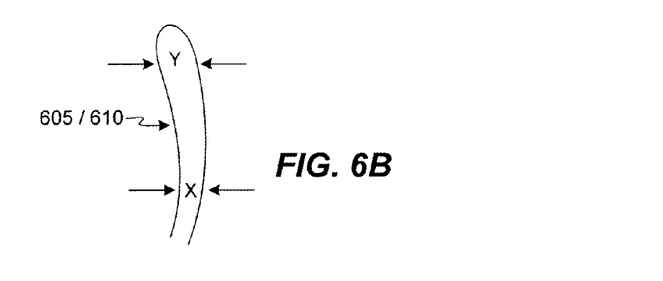

FIGS. 6A and 6B illustrate a protective cover 600, in accordance with a fourth exemplary embodiment of the present invention. As shown, protective cover 600 comprises a first sleeve 605 and a second sleeve 610. Also, as shown, the first sleeve 605 comprises a front pad 605A and a rear pad 605B. Likewise, the second sleeve 610 comprises a front pad 610A and a rear pad 610B. In this exemplary embodiment, the attachment mechanism comprises a fixed, thin strip of metal 615, which acts as both a connecting device as well as a spring to rotate the first and second sleeves 605 and 610 from a collapsed configuration (not shown) to a deployed configuration, as illustrated in FIG. 6A, where in the deployed configuration, the protective cover 600 is open and the first and second sleeves 605 and 610 are generally positioned side-by-side, whereas in the closed configuration, the protective cover 600 is closed and the first and second sleeves 605 and 610 are interleaved and overlapping or substantially overlapping each other. More specifically, due to the nature of the metal strip 615, as well as the relative size and positioning of the first and second sleeves 605 and 610, the first and second sleeves 605 and 610 can be rotated into each other, such that the metal strip 615 bends, and naturally remains in a bent position, while the first and second sleeves 605 and 610 are interleaved in the closed or collapsed configuration (not shown). When the consumer applies an opening force to the sleeves, the metal strip 615 springs back to its linear state so that the first and second sleeves 605 and 610 are in an open or deployed configuration as illustrated in FIG. 6A.

The protection cover 600, like the protection cover 500, shares certain common features with the protection covers 100 and 400, described above. Namely, the protection cover 600 has a contour C that matches or substantially matches the contour of the eyeglasses it is intended to protect. Also, as previously explained, the space X, between the lower portions of the first and second sleeves 605 and 610 are narrower than the space Y, between the upper portions of the first and second sleeves 605 and 610, respectively. This best depicted in FIG. 6B, which illustrates a cross-section view of either the first sleeve 605 or the second sleeve 610.

Figure 7A:
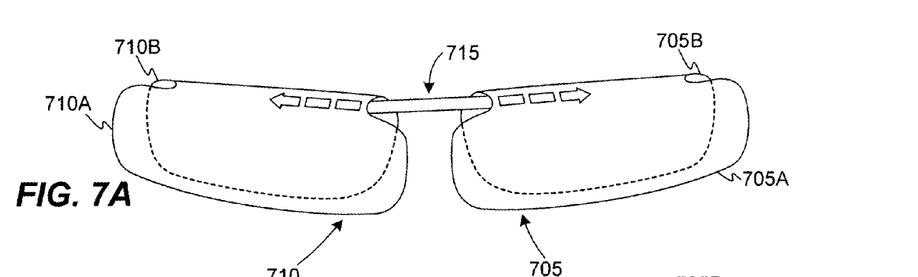
FIGS. 7A-7B illustrate a protective cover, in accordance with an alternative to the fourth exemplary embodiment of the present invention.
Figure 7B:
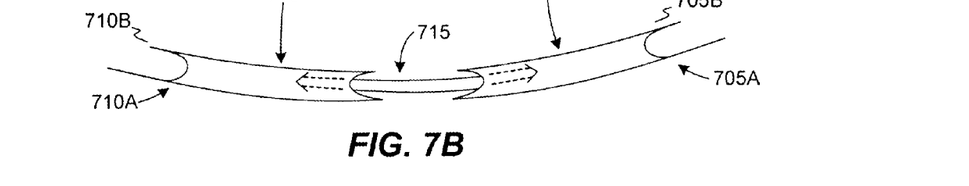

FIGS. 7A and 7B illustrate a protective cover 700, in accordance with an alternative to the fourth exemplary embodiment of the present invention. As with each of the prior embodiments, the protective cover 700 comprises a first sleeve 705, a second sleeve 710, where the first sleeve 705 comprises a front pad 705A and a rear pad 705B and the second sleeve 710 comprises a front pad 710A and a rear pad 710B. However, in accordance with this alternative embodiment, the metal strip 715 is not fully fixed, as shown. More particularly, either or both ends of the metal strip 715 may be slidably attached to the corresponding sleeve. In FIG. 7A, the metal strip 715 is slidably attached at both ends. Because the metal strip 715 is slidably attached, the consumer can adjust the separation space between the first sleeve 705 and the second sleeve 710. This may be beneficial if the consumer wishes to use the protective cover 700 with more than one pair of eyeglasses, where the eyeglasses are different in size and have a different degree of separation between their respective lenses. FIG. 7B illustrates a top view of the protective cover 700 in FIG. 7A.

Herein below, three additional exemplary embodiments are described. These three additional exemplary embodiments differ from the aforementioned exemplary embodiments in that the first and second sleeves are not interleaved when the protective cover is in a collapsed configuration. It will be understood, however, that it is certainly within the scope of the present invention to arrange these additional exemplary embodiments so that the first and second sleeves are, in fact, interleaved when the protective cover is a collapsed configuration. Moreover, two of the three additional exemplary embodiments exhibit a contour C that matches or substantially matches the eyeglasses they are intended to protect, as with the each of the previously described exemplary embodiments. However, the third additional exemplary embodiment exhibits no contour. Again, it will be understood that it is within the scope of the present invention to arrange this third additional exemplary embodiment so that the protective cover does, in fact, exhibit a contour.

FIGS. 8A-8E thus illustrate a protective cover 800, in accordance with a fifth exemplary embodiment of the present invention. As shown, the protective cover 800 comprises a first sleeve 805 and a second sleeve 810, wherein the first sleeve 805 comprises a front pad 805A and a rear pad 805B, while the second sleeve 810 comprises a front pad 810A and a rear pad 810B. In this fifth exemplary embodiment, the attachment mechanism is in the form of a ball and socket 815. As shown, one sleeve, e.g., the second sleeve 810, comprises the ball portion 815A, and the other sleeve, e.g., the first sleeve 805, comprises the socket portion 815B. More specifically, in FIGS. 8A-8E, the front pad 810A of the second sleeve 810 comprises the ball portion 815A and the front pad 805A of the first sleeve 805 comprises the socket portion 815B. However, it will be understood that the ball portion 815A and the socket portion 815B could alternatively be arranged on the rear pads 810B and 805B.

Figure 8A:
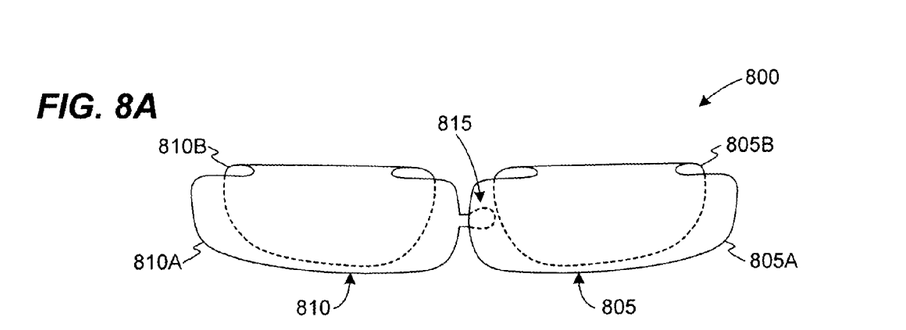
FIGS. 8A-8E illustrate a protective cover, in accordance with a fifth exemplary embodiment of the present invention.
Figure 8B:
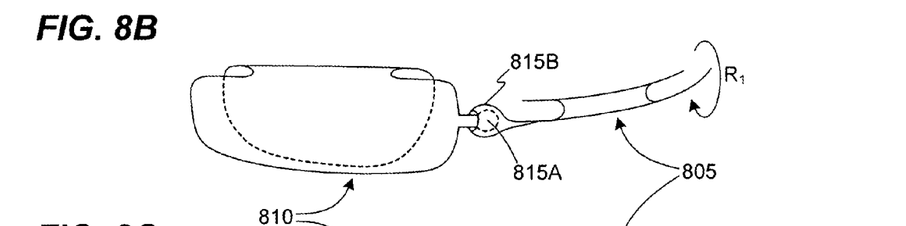
Figure 8C:
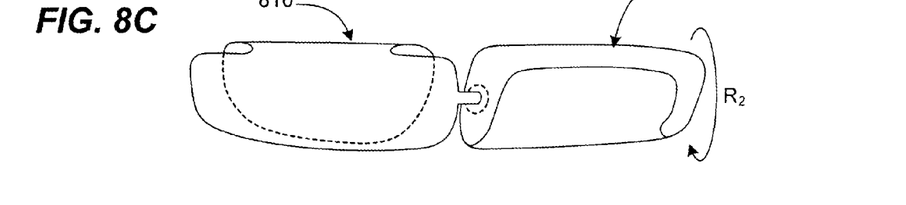
Figure 8D:
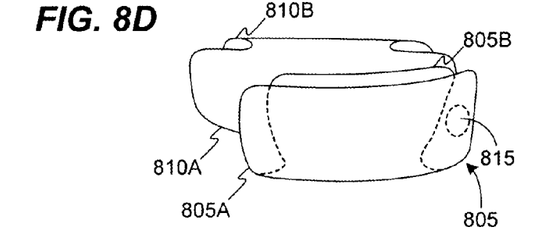

FIGS. 8A-8D also illustrate the operation of the protective cover 800. Thus, FIG. 8A illustrates the protective cover 800 in a deployed configuration, where the first and second sleeves 805 and 810 are open and generally positioned side-by-side. FIG. 8D illustrates the protective cover 800 in a collapsed configuration, where the first and second sleeves 805 and 810 are closed in stacked arrangement, and overlapping or substantially overlapping each other.

Figure 8E:
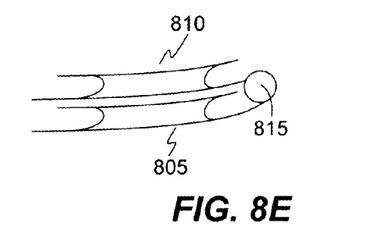

As illustrated in FIGS. 8B-8D, the consumer may rotate the first and second sleeves 805 and 810 relative to each other so that the socket, in turn, rotates around the ball. In this exemplary embodiment, the consumer continues to rotate the first and second sleeves 805 and 810 until one of the sleeves has been rotated 180 degrees relative to the other sleeve, as illustrated by vector $R_1$ (90 degrees) and $R_2$ (180 degrees) in FIGS. 8B and 8C. At this point, the consumer may then fold the first and second sleeves onto each other so they are in the aforementioned stacked arrangement, as illustrated in FIG. 8D. FIG. 8E is a top view of protective cover 800 in the collapsed configuration. To deploy the protective cover 800, the consumer may reverse the steps illustrated in FIGS. 8B-8D.

Figure 9A:
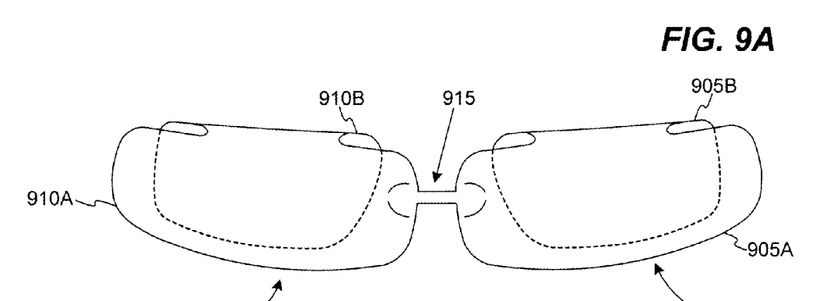
FIGS. 9A-9C illustrate a protective cover, in accordance with a sixth exemplary embodiment of the present invention.
Figure 9B:
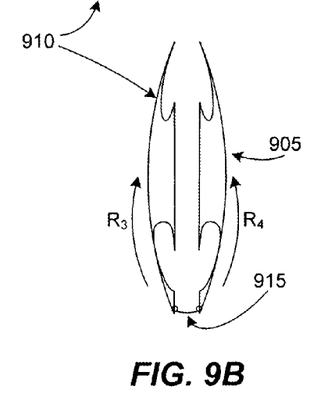
Figure 9C:
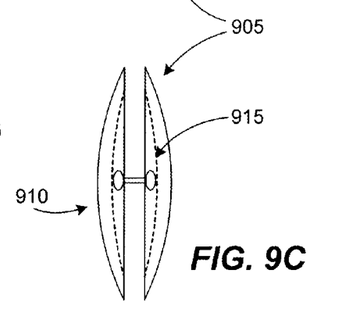

FIGS. 9A-9C thus illustrate a protective cover 900, in accordance with a sixth exemplary embodiment of the present invention. As shown, the protective cover 900 comprises a first sleeve 905 and a second sleeve 910, wherein the first sleeve 905 comprises a front pad 905A and a rear pad 905B, while the second sleeve 910 comprises a front pad 910A and a rear pad 910B. In this sixth exemplary embodiment, the attachment mechanism is in the form of a double ball and socket 915. In this exemplary embodiment, the consumer may fold the first and second sleeves back on each other in a "clam shell" configuration, as illustrated by vector $R_3$ and $R_4$ in FIG. 9B. FIGS. 9B and 9C are top and side views, respectively, of protective cover 900 in a collapsed configuration, wherein the protective cover 900 is closed in a "clam shell" arrangement. To deploy the protective cover 900, the consumer may apply a small amount of force in a direction opposite that of vectors $R_3$ and $R_4$. FIG. 9A illustrates the protective cover 900 in the deployed configuration, where the protective cover 900 is open and the first and second sleeves 905 and 910 are generally positioned side-by-side relative to each other.

This sixth exemplary embodiment may additionally employ a spring (not shown). The spring may work in conjunction with the attachment mechanism 915, where the spring would, upon activation by the consumer, automatically open or assist in opening the protective cover 900 to its deployed configuration.

Figure 10A:
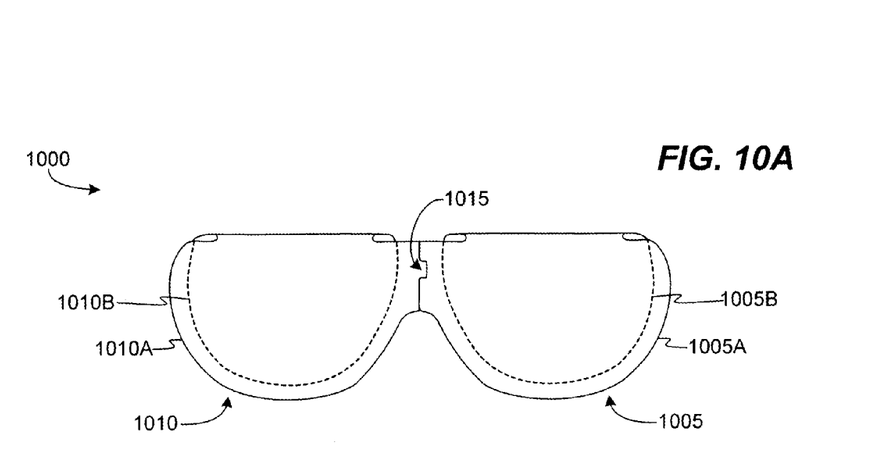
FIGS. 10A and 10B illustrate a protective cover, in accordance with a seventh exemplary embodiment of the present invention.
Figure 10B:
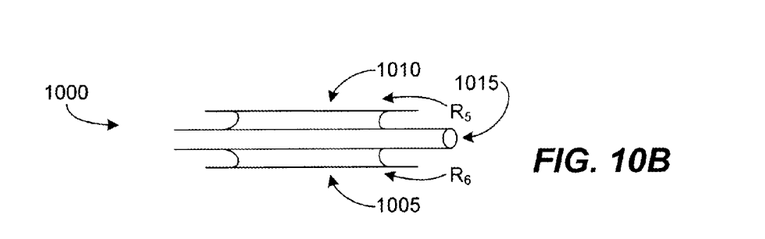

FIGS. 10A and 10B illustrate a protective cover 1000, in accordance with a seventh exemplary embodiment of the present invention. As shown, the protective cover 1000 comprises a first sleeve 1005 and a second sleeve 1010, wherein the first sleeve 1005 comprises a front pad 1005A and a rear pad 1005B, while the second sleeve 1010 comprises a front pad 1010A and a rear pad 1010B. In this seventh exemplary embodiment, the attachment mechanism is in the form of a hinge 1015.

FIGS. 10A and 10B also illustrate the operation of the protective cover 1000. Thus, FIG. 10A illustrates the protective cover 1000 in a deployed configuration, where the first and second sleeves 1005 and 1010 are open and generally positioned side-by-side. FIG. 10B illustrates the protective cover 1000 in a collapsed configuration, where the first and second sleeves 1005 and 1010 are closed in flat stack arrangement, and overlapping or substantially overlapping each other.

More specifically, in this exemplary embodiment, the consumer may fold the first and second sleeves 1005 and 1010 forward on each other so they are in the aforementioned flat stack arrangement, as illustrated by vector $R_5$ and $R_6$ in FIG. 10B. FIG. 10 is a top view of protective cover 1000 in the collapsed configuration. To deploy the protective cover 1000, the consumer may apply a small amount of force in a direction opposite that of vectors $R_5$ and $R_6$. This exemplary embodiment may additionally employ a spring (not shown) to work in conjunction with the attachment mechanism 1015, where the spring would, upon activation by the consumer, automatically deploy or assist in deploying the protective cover 1000 to its open configuration, which is illustrated in FIG. 10A.

As mentioned above, protective cover 1000, in accordance with the seventh exemplary embodiment, exhibits little or no contour. The reason for this is that some eyeglasses, e.g., aviator eyeglasses, often exhibit little or no contour. However, it will be understood that the it is within the scope of the present invention for the protective cover 1000 to exhibit contour.

The present invention has been described in terms of various exemplary embodiments. It will be understood that the certain modifications and variations of the various features are possible without departing from the scope and spirit of the present invention.

What is claimed is:

1. A collapsible eyewear protector configured to be opened into an eyewear-receiving position and to be alternatively closed into a collapsed storage position, the collapsible eyewear protector comprising first and second lens covers, each lens cover comprising a first cover portion and a second cover portion such that only the first cover portion of the first and second lens covers are rotatably hinged to each other to permit the eyewear protector to open and close between the eyewear-receiving and collapsed positions, the collapsible eyewear protector configured such that, when in the collapsed storage position, the first and second lens covers are substantially interleaved with each other such the first cover portion of the second lens cover is positioned directly in between the first cover portion and the second cover portion of the first lens cover, and the second cover portion of the first lens cover is positioned directly in between the first cover portion and the second cover portion of the second lens cover.

2. The collapsible eyewear protector of claim 1, further comprising a soft fabric lining an interior surface of the first lens cover and the second lens cover.

3. The collapsible eyewear protector of claim 1, wherein the first cover portion of the first and second lens covers is larger than the second portion of the first and second lens covers.

* * * * *